United States Patent [19]

Matsumoto et al.

[11] Patent Number: 4,998,754

[45] Date of Patent: Mar. 12, 1991

[54] DRAINPIPE JOINT

[75] Inventors: Shigeyuki Matsumoto, Ibaraki; Tomoyoshi Kawamura, Saitama, both of Japan

[73] Assignee: Benkan Corporation, Japan

[21] Appl. No.: 437,265

[22] Filed: Nov. 16, 1989

[30] Foreign Application Priority Data

Nov. 18, 1988 [JP] Japan .............................. 63-150661

[51] Int. Cl.⁵ .......................................... F16L 41/00
[52] U.S. Cl. .................................. 285/150; 285/132; 285/176; 285/155; 285/156; 138/DIG. 11; 138/177; 4/211; 4/DIG. 7
[58] Field of Search ............... 285/156, 150, 153, 154, 285/155, 151, 152, 132, 176, 180, 181, 183, 179; 138/DIG. 11, 170, 177; 4/DIG. 7, 211; 137/247.29, 247.27; D23/266, 262, 263

[56] References Cited

U.S. PATENT DOCUMENTS

| | | | |
|---|---|---|---|
| 1,186,280 | 6/1916 | Carson | 285/156 X |
| 3,346,887 | 10/1967 | Sommer | 285/156 X |
| 4,639,017 | 1/1987 | Domas | 285/179 X |

Primary Examiner—Randolph A. Reese
Assistant Examiner—Heather Chun
Attorney, Agent, or Firm—Eric P. Schellin

[57] ABSTRACT

In a vent-free single-duct drainage piping system for vertical installation in multi-storied buildings with horizontally extending branches to receive drain from sources of different floors of the building installed, a joint for connecting vertical pipe sections of the drainage piping system is disclosed, which comprises an upper pipe portion having a spiral axis between opposite end portions thereof and adapted for connection to the upstream side of the vertical drainage system to receive drain therfrom. A lower pipe portion is comprised of a first vertical passage connected in direct fluid flow relationship with the upper pipe portion and a second vertical passage having at a side thereof side ports adapted for connection to horizontal drainage pipes laid at a particular floor of the building. The first vertical passage receives drain from the upper pipe portion and the second vertical passage receives drain from the horizontal pipes. Both first and second passages merge at lower ends thereof into a common outlet port adapted for connection to the downstream side of the system. The helix of the upper pipe section is provided to reduce the velocity of the drain falling from the drainage system, thereby lessening pulsations and sounds developed in drain water.

2 Claims, 5 Drawing Sheets

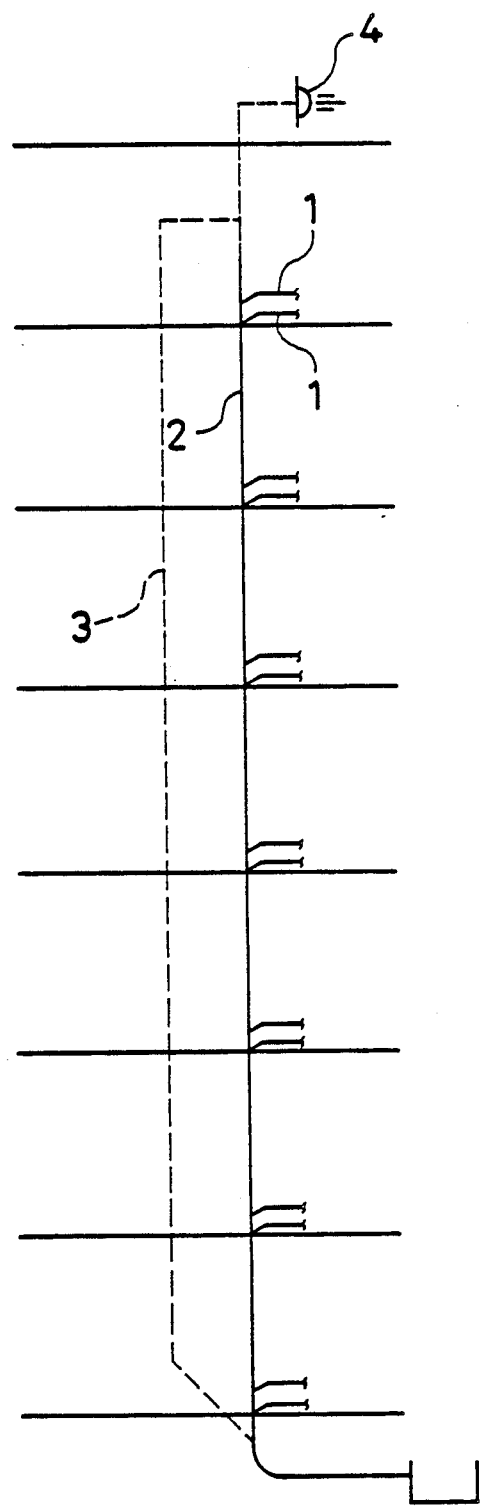
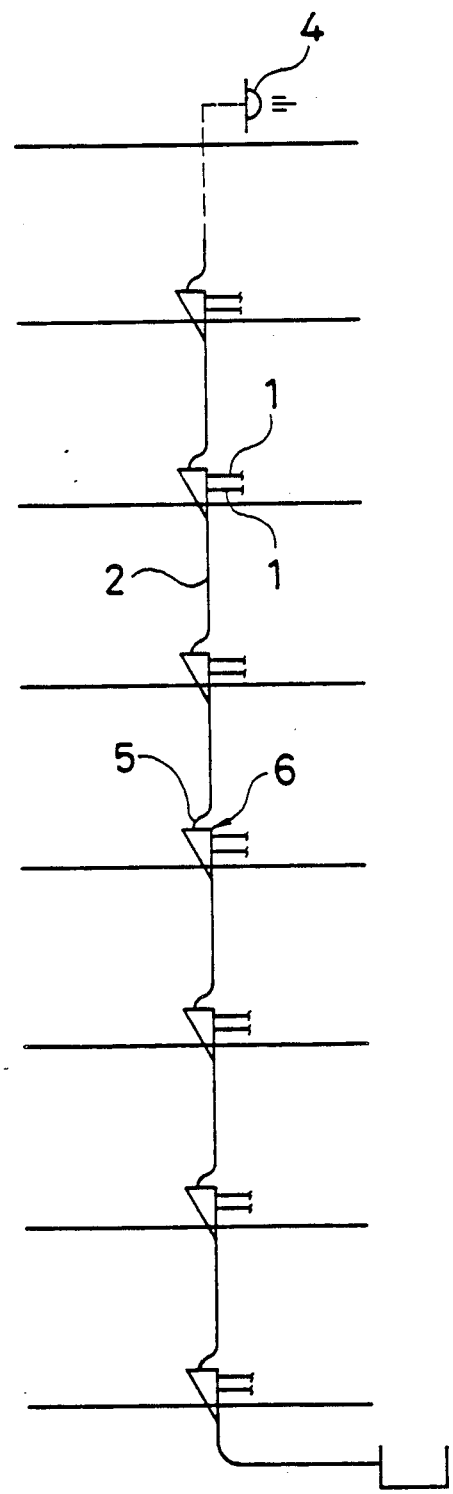
FIG.4 PRIOR ART
FIG.5 PRIOR ART

DRAINPIPE JOINT

BACKGROUND OF THE INVENTION (1). Field of the Invention

The present invention relates to improvements in drainpipe joints in single-pipe type drainage systems with the omission of a vent pipe in multi-storied buildings.

(2). Description of the Related Art

In a vertical drainpipe installed in a multi-storied building, the flushing action produced at a joint where a horizontal branch pipe joins the vertical pipe, in addition to the suction force induced when sewage discharged from toilet stools, bathtubs and the like and introduced into the vertical pipe falls plumb down, causes negative or positive air pressure to sharply fluctuate. The fluctuation of the air pressure allows the water confined in the trap of the toilet stool or bathtub to be sucked out or the air therein to blow up. As a result, a malodorous gas deriving from the sewage may penetrate into rooms, thus resulting in unsanitary living conditions.

In order to obviate such a discouraging phenomenon, a drainpipe is normally equipped with a vent pipe open to the atmosphere to minimize the fluctuation of the air pressure. The water is thus protectively secured in the trap. FIG. 4 shows a drainage system provided with such a vent pipe, the drainage system comprising horizontal branch pipes 1, a vertical pipe 2, a vent pipe 3, and a vent cap 4 for releasing the sewage gas therefrom to decrease the growth of air pressure.

On the other hand, single-pipe type drainage systems with the omission of such a vent pipe 3 have come into common use partly because the drainage system with the vent pipe 3 requires a large piping space and partly because its piping construction becomes costly.

More specifically, a single drainpipe joint allowing the omission of the vent pipe is often employed in that an S-shaped pipe is provided on the upstream side of a joint where a horizontal branch pipe meets the vertical pipe to reduce not only the suction force produced in the vertical drainpipe but also the falling velocity of sewage which forms the main cause of pressure fluctuation therein, whereas the joint where the horizontal branch pipe joins the vertical pipe is so contrived that the fluctuation of the negative or positive air pressure is minimized.

FIG. 5 shows a drainage system equipped with such single drainpipe joints, the drainage system comprising horizontal branch pipes 1, a vertical pipe 2, a vent cap 4, S-shaped pipes 5, and single drainpipe joints 6.

There are structural variations of the single drainpipe joint 6 having the S-shaped pipe 5 as shown in FIGS. 6 to 8. The single drainpipe joint 6 shown in FIGS. 6a, 6b has an elliptical joint in section having bilevel junction ports 7, 8 of a vertical pipe 9 for a horizontal branch pipe, eccentric branch passages 11 with a partition wall 10 for dividing the upper half of the joint into sections, an S-shaped pipe 5 coupled to the upper ends of the branch passages 11, and an upper-end junction port 5a situated on the vertical axis λ of the vertical pipe 9. The single drainpipe joint 6 shown in FIGS. 7a, 7b has a branch pipe 12 branching off diagonally upwardly from the lower portion of the vertical pipe 9 having the bilevel junction ports 7, 8 for the horizontal branch pipe, the upper half of the branch pipe being vertically eccentric, the S-shaped pipe 5 incorporated with the upper end of the branch pipe 12, and the upper-end junction port 5a situated on the vertical axis λ of the vertical pipe 9.

The single drainpipe joint 6 shown in FIGS. 8a, 8b has the S-shaped pipe 5 directly incorporated with the upper-end of the vertical pipe 9 having the bilevel junction ports 7, 8 for the horizontal branch pipe, and the upper-end junction port 5a situated on the vertical axis λ of the vertical pipe 9.

Each of the aforementioned single drainpipe joints 6 is exceedingly effective in reducing the falling velocity of sewage by means of the S-shaped pipe 5. However, the centrifugal force induced when the sewage changes its course in the bent portion of the S-shaped pipe 5 causes the sewage to swirl and the vortex flow is directed clockwise and counterclockwise from time to time with instability, depending on the falling condition of the sewage. Moreover, the clockwise and counterclockwise whirls occur alternately, which causes the air pressure in the drainpipe to pulsatingly fluctuate and also badly affects the water confined in the trap.

SUMMARY OF THE INVENTION

An object of the present invention is to provide an improved single drainpipe joint capable of preventing air pressure in a drainpipe from pulsatingly fluctuating by causing the vortex flow to be directed only unidirectionally.

In order solve the aforementioned problems, a joint for connecting discrete vertical pipes of a vent-free single-duct drainage piping system vertically laid in a multi-storied building, comprises a lower straight section for connection to a downstream side pipe of the system and an upper pipe portion having a spiral axis between opposite ends thereof and adapted for connection to an upstream side pipe of the system. The lower pipe section interconnects consist of a first vertical passage having at a side thereof a multiplicity of side ports adapted for connection to horizontal pipings laid on a floor of the building to receive drain from the floor. The lower pipe section also has a second vertical passage spaced from the first pipe section and connected for direct fluid flow relationship with the upper pipe portion. A partition may preferably be installed inside the middle vertical section, mounted to extend between the lowermost end of the upper pipe portion and the uppermost end of the lower pipe portion, to define the first and second vertical passages. Furthermore, the first vertical passage is connected in direct fluid flow relationship with the upper pipe section and merges at a lower end thereof with a lower end of the second vertical passage to form a common outlet port adapted for connection to the downstream side of the drainage system.

In an alternate modification of the above-mentioned embodiment, the first vertical passage and the second vertrical passage of the lower pipe portion are a pair of discrete vertical pipes arranged side by side.

With the above-mentioned structure of the joint, the helix of the upper vertical section is constructed with a predetermined curvature so as to give the drain sent down therethrough a centrufugal force that generates a unidirectional vortex in the drain flow. As a result, the falling velocity of the drain as it is flushed down the vertical upper section of the joint is reduced, with a resultant lessening of pulsations and rattling sounds in the drainage piping system.

BRIEF DESCRIPTION OF THE DRAWINGS

FIG. 4 is a schematic view of a convention drainage system with a vent pipe in a multi-storied building.

FIG. 5 is a schematic view of a drainage system using conventional single drainpipe joints.

DESCRIPTION OF THE PREFERRED EMBODIMENTS

Figure 1A:
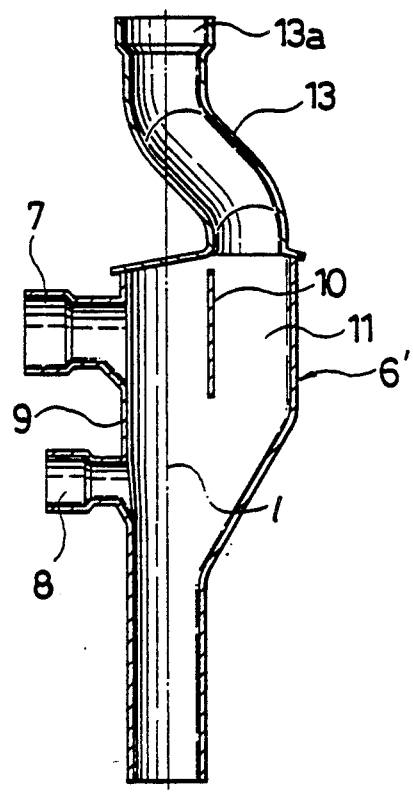
FIGS. 1 to 3 show single drainpipe joints embodying the present invention; (a) is a vertical sectional view; and (b) is a top view.

Referring now to the accompanying drawings, there are shown single drainpipe joints embodying the present invention. A single drainpipe joint 6 ' shown in FIGS.

1a, 1b has a vertically extending lower pipe section 9 carrying at a side thereof at least a pair of side ports 7 and 8 having a preferably elliptical cross section adapted for connection to horizontal drainage pipes, not shown, laid on a floor of a multi-storied building to receive drain water from sources, such as a kitchen sink, a bathroom toilet, and a shower drain hole. The paired side ports 7 and 8 may preferably be situated in vertical position, with the one above the other.

The lower pipe section 9 may preferably carry therein a vertical partition 10 which is provided to define a first vertical passage 11 and a second vertical passage 1. Also, the joint 6 ' includes an upper pipe section 13 having a helical configuration having a spiral axis running between opposite ends of the upper pipe section. In addition, the upper pipe section 11 has at an upper end thereof an inlet port 13a adapted for connection to a lower end of an upstream side pipe section of a drainage piping system, not shown, of the vertical drainage system. In this arrangement the first and second vertical passages 11 and 1 pass both the drain from the upper pipe portion 13 and the drain through the side ports 7 and 8 into the downstream side pipe section.

Figure 1B:
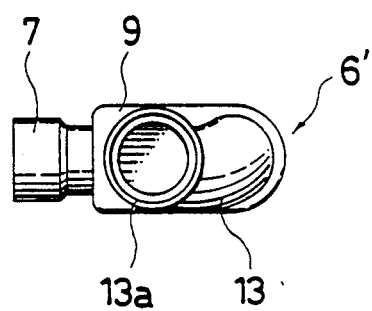

The helix of the axis in the upper pipe section 13 has a predetermined curvature, as can best be shown in FIG. 1b, that can reduce the velocity of the drain sent through the upper inlet port 13a.

Figure 2A:
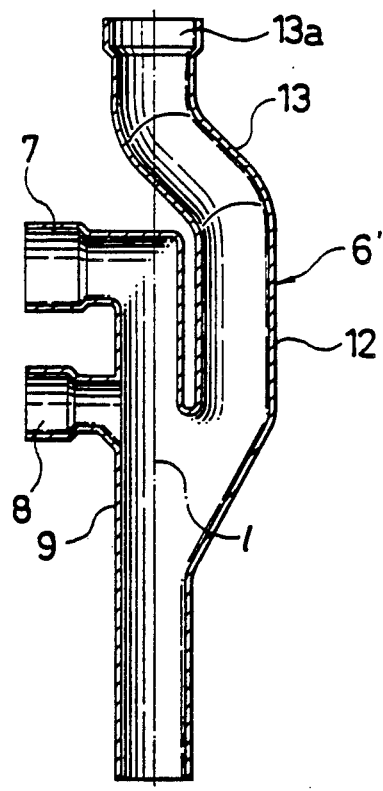
Figure 2B:
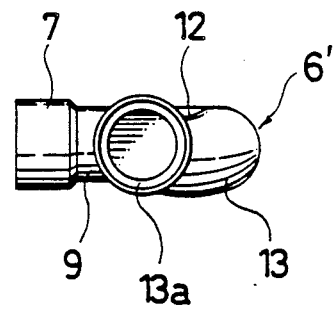

An alternate modification of the above preferred imbodiment of the joint 6 ' is illustrated in FIGS. 2a and 2b, in which the first vertical passage 11 of the first embodiment is replaced by a discrete pipe section 12 adapted for connection at an upper end thereof to the upper pipe section 13. In this particular embodiment, the second vertical passage 1 of the earlier embodiment also comes as a discrete pipe section 1 spaced from the first vertical passage 11 and adapted for connection at a side thereof to open into the side parts 7 and 8. Except for the division of the lower pipe section 9, the joint 6 ' of FIG. 2a is substantially similar in structure and construction to the one depicted in FIG. 1a.

Figure 3A:
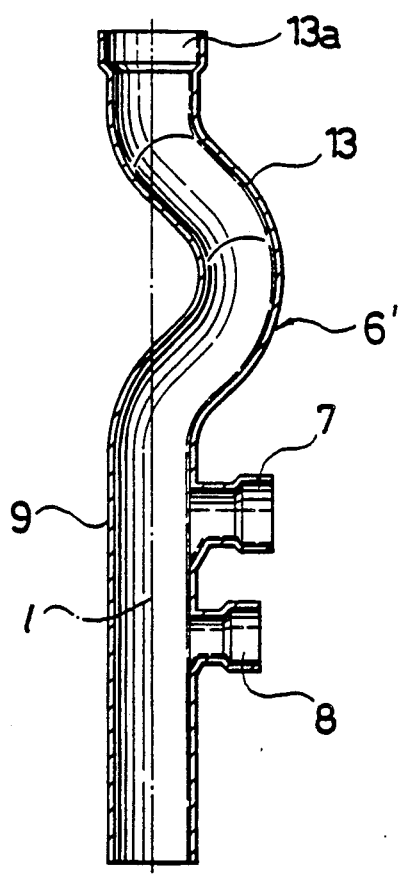
Figure 3B:
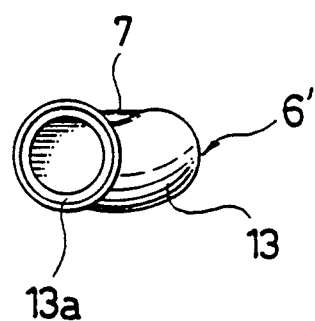
Figure 6A:
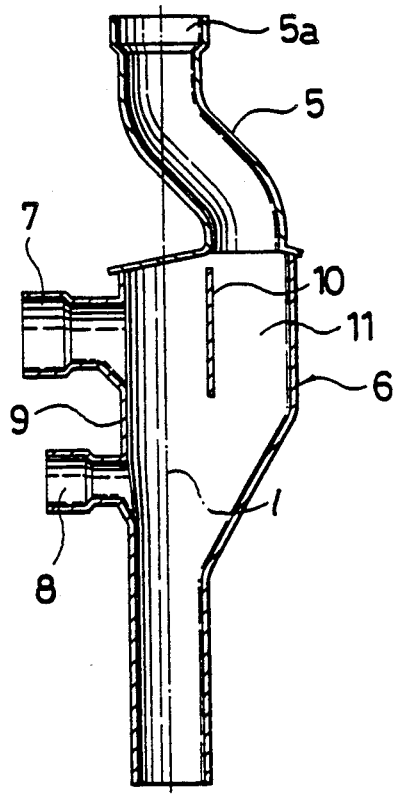
FIGS. 6 to 8 are diagrams illustrating conventional single drainpipe joints; (a) is vertical sectional side view; and (b) top view.
Figure 6B:
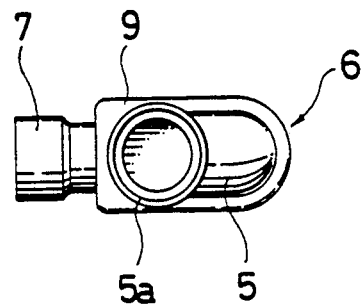
Figure 7A:
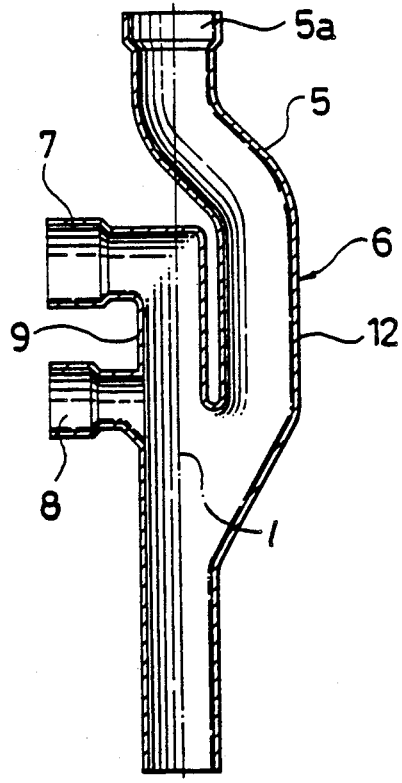
Figure 7B:
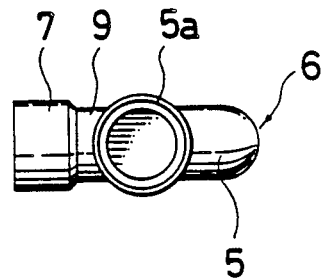
Figure 8A:
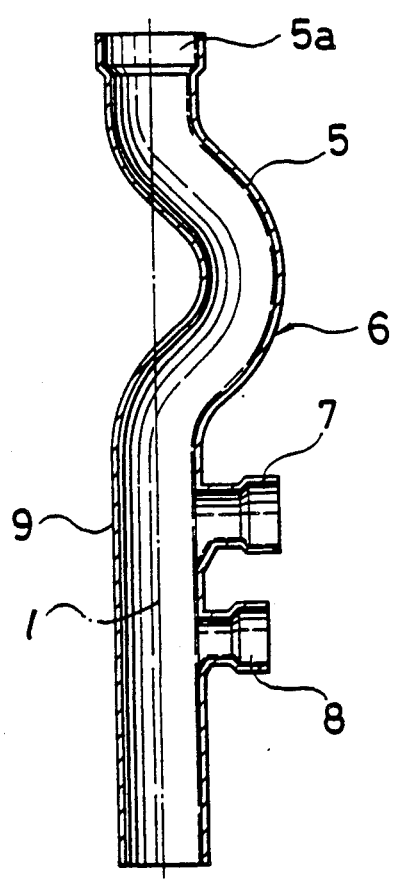
Figure 8B:
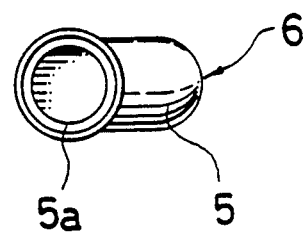

A still further modified form of the joint 6 ' is illustrated in FIG. 3a and 3b, which comprises an upper pipe section 13 of a helical configuration having a spiral axis extending between opposite ends thereof and a vertical lower pipe section 9. The upper pipe section 13 has at an upper end thereof an inlet port 13a adapted for connection to an upstream pipe section of a drainage piping system installed in a multi-storied building. The vertical lower pipe section 9 carries at a side thereof at least a pair of side ports 7 and 8 adapted for connection to horizontal drain pipings to receive drain from a floor of the building. As in the earlier embodiments, the side ports 7 and 8 may be preferably situated vertically one above the other. Also, the helix of the upper pipe section 13 is constructed with a predetermined curvature that can reduce the velocity of the drain sent through the upper inlet port 13a.

In either of the above embodiments, the helix of the upper pipe section 13 also assists developing a unidirectional vortex in the drain flowing therethrough. This effect, coupled with the reduced velocity of the drain, would contribute to lessen pulsations and rattling sounds in the associated drainage piping system. In addition, the impact of the drain impinging on the inside walls of the drainage piping system will also be reduced, because of the reduced drain velocity.

As set forth above, since the helical axis of the upper pipe section in the joint 6 ' according to the present invention causes the drain flowing through its curved passage in the middle to slow down its velocity while allowing the drain to develop a directional centrifugal force. As a result, pulsations and sounds in the drain are minimized. The allowable drainage capacity of the single-pipe type drainage system can therefore be increased and this contributes to the improvement of its function because more fixtures can be added to the system without increasing the piping size.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. In a vent-free single-duct drainage piping system for vertical installation in multi-storied buildings, a joint for interconnecting vertical pipe sections of the drainage piping system comprising:

an upper pipe portion having at an upper end thereof an inlet port adapted for connection to a lower end of an upstream side pipe section of the drainage piping system to receive drain coming down through the upstream side pipe section, the upper pipe portion having a helical configuration so as to define a spiral axis along a longitudinal length thereof between the inlet port and an outlet port defined at a lower end of the upper pipe portion, a substantially straight lower pipe connected to the outlet port of the upper pipe portion and having at a side thereof a multiplicity of side ports adapted for connection to horizontal drainage pipes laid on a floor of the building to receive drain from the horizontal drainage pipes, the straight lower pipe portion having at a lower end thereof an outlet port adapted for connection to an upper end of a downstream side pipe section of the drainage piping system to pass both the drain from the upper pipe portion and the drain from the side ports down into the downstream side pipe section, a vertical partition mounted inside the lower pipe portion between the outlet port of the lower pipe portion to define a first passage provided for direct fluid flow relationship with the upper pipe portion and a second passage provided for direct fluid flow relationship with the side ports, and the upper pipe portion having an upper part thereof axially aligned with the second passage of the lower pipe portion.

2. In a vent-free single-duct drainage piping system for vertical installation in multi-storied buildings, a joint for interconnecting vertical pipe sections of the drainage piping system comprising:

an upper pipe portion having at an upper end thereof an inlet port adapted for connection to a lower end of an upstream side pipe section of the drainage piping system to receive drain coming down through the upstream side pipe section, the upper pipe portion having a helical configuration so as to define a spiral axis along a longitudinal length thereof between the inlet port and an outlet port defined at a lower end of the upper pipe portion, a substantially straight first lower pipe portion connected to the outlet port of the upper pipe section to receive drain therefrom, a substantially straight second lower pipe portion mounted spaced from the first lower pipe portion and having at a side thereof a multiplicity of side ports adapted for connection to horizontal drainage pipes laid on a floor of the buildings to receive drain from the horizontal pipes, a second lower pipe portion having a top portion thereof closed and at a lower end an outlet port adapted for connection to a downstream side section of the drainage piping system, the first lower pipe portion having at a lower end thereof an outlet port opened into the outlet port of the second lower pipe portion to thereby pass both the drain from the upper pipe portion and the drain from the side ports into the downstream side pipe section, and the upper pipe portion having an upper half thereof axially aligned with the second lower portion.

* * * * *